(12) United States Patent
Xie

(10) Patent No.: US 7,377,528 B1
(45) Date of Patent: May 27, 2008

(54) CAMBERING VEHICLE WITH ROCKING-BAR CAMBERING MECHANISM

(76) Inventor: Jingbo Xie, 45256 Roundview Dr., Novi, MI (US) 48375

( * ) Notice: Subject to any disclaimer, the term of this patent is extended or adjusted under 35 U.S.C. 154(b) by 305 days.

(21) Appl. No.: 11/071,843

(22) Filed: Mar. 3, 2005

Related U.S. Application Data

(60) Provisional application No. 60/549,960, filed on Mar. 4, 2004.

(51) Int. Cl.
*B62M 1/00* (2006.01)

(52) U.S. Cl. .............. 280/87.041; 280/639; 280/647; 280/220

(58) Field of Classification Search ............ 280/11.19, 280/11.27, 29, 40, 87.041, 87.042, 87.05, 280/220, 639, 647
See application file for complete search history.

(56) References Cited

U.S. PATENT DOCUMENTS 3,913,932 A * 10/1975 Guerriero et al. ..... 280/124.145
3,979,136 A * 9/1976 Lassiere ..................... 280/278
6,827,358 B2 * 12/2004 Beleski, Jr. ............ 280/87.041
2002/0050695 A1 * 5/2002 Feng ..................... 280/87.041
2002/0140193 A1 * 10/2002 Chai ..................... 280/87.041
2005/0001399 A1 * 1/2005 Yeo et al. .............. 280/87.041
2005/0082778 A1 * 4/2005 Chuang ................. 280/87.041
2005/0247156 A1 * 11/2005 Vaisanen ..................... 74/493

* cited by examiner

*Primary Examiner*—Christopher P. Ellis
*Assistant Examiner*—Katy Meyer

(57) ABSTRACT

The inventive device includes a tricycle frame comprising a front wheel steering mechanism, the left and right trailing arms with folding mechanism, the left and right rear wheel brake systems, and a cambering mechanism. The improvements have been made to the construction and operation of cambering mechanism, the trailing arm folding and locking mechanism and the handlebar. It provides better maneuverability and stability during cambering maneuver, easier operation of folding, and quick assembly and disassembly of a one-piece handlebar. This is achieved through an original cambering mechanism with a rocking-bar connecting spherical bearings and a polymer energy-storing element, and an original, easy to operate and anti-disengagement sleeve-type folding mechanism, and a one-piece steering handlebar with quick handlebar locking mechanism.

3 Claims, 9 Drawing Sheets

CAMBERING VEHICLE WITH ROCKING-BAR CAMBERING MECHANISM

CROSS REFERENCE TO RELATED APPLICATIONS

The application claims the benefit of PPA Ser. No. 60/549,960 filed on Mar. 4, 2004 by the present inventor

FEDERALLY SPONSORED RESEARCH

Not Applicable

SEQUENCE LISTING OR PROGRAM

Not Applicable

BACKGROUND OF THE INVENTION

1. Field of Invention

The present invention relates generally to a three wheel cambering vehicle and more specifically it relates to a cambering vehicle with a rocking-bar cambering mechanism and trailing arm folding mechanism, for providing better maneuverability and stability during cambering maneuver, and for easier operation of folding. better maneuverability and stability are achieved through an original cambering mechanism with a rocking-bar connecting spherical bearings and polymer energy-storing element. The easier operation of folding is achieved through an original, easy to operate and anti-disengagement sleeve-type folding mechanism. The invention also uses a one-piece steering handlebar and a quick handlebar locking mechanism to improve the robustness of the steering, and easiness of assembly.

2. Description of the Related Art

It can be appreciated that three wheel cambering vehicles have been in use for years. Typically, three wheel cambering vehicles are comprised of a steerable front wheel controlled by a steering handlebar (just as for a regular bicycle); a pair of rear wheels on mounted on the two trailing arms; two foot pedals on the trailing arms; two brakes on the rear wheels; a trailing arm folding and locking mechanism to make the vehicle portable; and a cambering mechanism which interconnects the steering column and two trailing arms.

The main problems of conventional three wheel cambering vehicles are commonly with the cambering mechanism. The cambering mechanism for the vehicles patented in U.S. Pat. Nos. 6,220,612 & 6,499,751 (Cambering vehicle and mechanism), U.S. Pat. No. 6,467,781 (Tricycle), U.S. Pat. No. 6,517,093 (Foldable tricycle), and U.S. Pat. No. 6,554,302 (Tricycle operated by torsion thereof) are based on the same principle. It has a freely rotating yoke in the middle, whose ends are connected with the polymer donuts on the two trailing arms. With this design, when the vehicle tilts, the yoke deforms the polymer donuts. The two polymer donuts serve both as the connection elements and as the energy storing element (spring). When the rider of the vehicle tilts his or her body to the inside of the turn to perform cambering maneuver, the polymer donut on the trailing arm at the inner side of the turn is deformed easily by the body weight. But, the deformation of the donut on the trailing arm at the opposite side relies on the push of the foot. If the foot fails to push enough to deform the polymer donut, the wheel at the outer side of the turn has the tendency to lift off the ground. It is especially so for deeply tilted turns. The lift of the wheel makes the motion unstable and may cause the maneuver to be out of control. The root cause of the situation is two independent energy-storing element. Actually, this double polymer-donut design also makes tilting rigid, especially for children or for sharp turn maneuvers.

The second common problem with conventional three wheel cambering vehicles is that their folding mechanisms aren't easy to use, since they all use finger pressure. Pins are always jammed due to the nature of the folding mechanism. It's difficult to apply adequate finger pressure, especially for children.

Another problem with conventional three wheel cambering vehicles is that they either have a two-piece steering handlebar design, which is not robust, or they have a one-piece handlebar design but the assembly and disassembly are not convenient. This convenience is important since the portability of the vehicle relies on it.

While these devices may be suitable for the particular purpose to which they are intended, there are limits and inconveniences as described above. It is highly beneficial to improve the design to achieve better maneuverability and stability during cambering maneuver, easier operation of folding, and robustness of a one-piece quick assembly and disassembly handlebar. In these respects, the cambering vehicle with rocking-bar cambering mechanism according to the present invention substantially departs from the conventional concepts and designs of the prior art. In so doing, the present invention provides an apparatus primarily developed for the purpose of providing better maneuverability and stability during cambering maneuver, easier operation of folding, and robustness of a one-piece quick assembly and disassembly handlebar. The invention presented here achieves these through an original cambering mechanism with a rocking-bar connecting spherical bearings and a polymer energy-storing element, an original, easy to operate and anti-disengagement sleeve-type folding mechanism, and a one-piece steering handlebar with a quick handlebar locking mechanism.

SUMMARY OF THE INVENTION

In view of the foregoing disadvantages inherent in the known types of three wheel cambering vehicles now present in the prior art, the present invention provides a new cambering vehicle construction wherein new structures are utilized. The new construction provides better maneuverability and stability during cambering maneuver, easier operation of folding, and robustness of a one-piece quick assembly and disassembly handlebar. This is achieved through an original cambering mechanism with a rocking-bar connecting spherical bearings and a polymer energy-storing element, an original, easy to operate and anti-disengagement sleeve-type folding mechanism, and a one-piece steering handlebar with a quick handlebar locking mechanism.

The general purpose of the present invention, which will be described subsequently in greater detail, is to provide a new cambering vehicle with rocking-bar cambering mechanism that has many of the advantages of the three wheel cambering vehicle mentioned heretofore. The present invention contains many novel features that result in a new cambering vehicle with rocking-bar cambering mechanism, anti-disengagement sleeve-type folding mechanism, and a one-piece steering handlebar with a quick handlebar locking mechanism, and which is not anticipated, rendered obvious, suggested, or even implied by any of the prior art three wheel cambering vehicle, either alone or in any combination thereof.

To attain this, the present invention generally comprises a tricycle frame with a front wheel steering mechanism, two trailing arms and two rear wheel brakes; a novel rocking-bar cambering mechanism; an novel anti-disengaging sleeve-based folding mechanism for folding trailing arms; and a novel one-piece handlebar clamping mechanism. As shown in FIG. 1, the front wheel steering mechanism comprises handlebar 2, steering shaft 5, steering shaft housing 6, steering column 7, front wheel mounting fork 10, and front wheel 11. The right and left trailing arms, respectively 13 and 17, are structures with their one end connected to the cambering linkage 8 and 9 accordingly. The other end of the trailing arms 13 and 17 are attached with foot pedals 14 and 18, and rear wheels 15 and 19. The brake system comprises brake handles 3 mounted on the handlebar 2, and brake lines and brake shoes. As shown in FIG. 2, the rocking-bar cambering mechanism basically comprises a front mounting block 23, a front pivot pin 24, two cambering linkage 8 and 9, right and left respectively, two spherical bearings 35 and 31, two bearing cushions 36 and 30, a central mounting block 33, a cylindrical polymer energy storing element (polymer spring) 34, and a rocking-bar 32. As shown in FIG. 3, the anti-disengaging sleeve-based folding mechanism comprises pivot pin 51, locking sleeve 12, locking spring 52, cylindrical locking fork 53, anti-disengaging plunger 55 and plunger spring 54. As shown in FIG. 4, the handlebar locking mechanism comprises fixed half-moon 1, movable half-moon 62, pivot pin 61, locking lever 63, locking pin 64, tie rod 65 and tie nut 60.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a cambering vehicle with rocking-bar cambering mechanism, anti-disengagement sleeve-type folding mechanism, a one-piece steering handlebar with a quick handlebar locking mechanism that will overcome the shortcomings of the prior art devices.

An object of the present invention is to provide the cambering vehicle with better maneuverability and stability during cambering. This is achieved through an original cambering mechanism design using spherical bearings, a polymer energy storing element and a rocking-bar.

Another object is to provide the cambering with better flexibility during turning maneuver.

Another object is to provide the cambering vehicle with a better folding mechanism. Instead of using finger pressure, the new mechanism uses a hold-and-pull of sleeve. This is much easier than using finger pressure. The new mechanism also prevents the accidental disengage of the sleeve.

Another object is to provide the cambering vehicle with a one-piece quick assembly and disassembly steering handlebar.

Another object is to provide the cambering vehicle with only one (instead of two as with the prior arts) energy-storing element (polymer spring). This will allow the engineer to have more flexibility when choose this "polymer spring" in both structural forms and spring parameters.

To the accomplishment of the above and related objects, this invention may be embodied in the form illustrated in the accompanying drawings, attention being called to the fact that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings wherein.

DETAILED DESCRIPTION OF THE INVENTION

Figure 1:
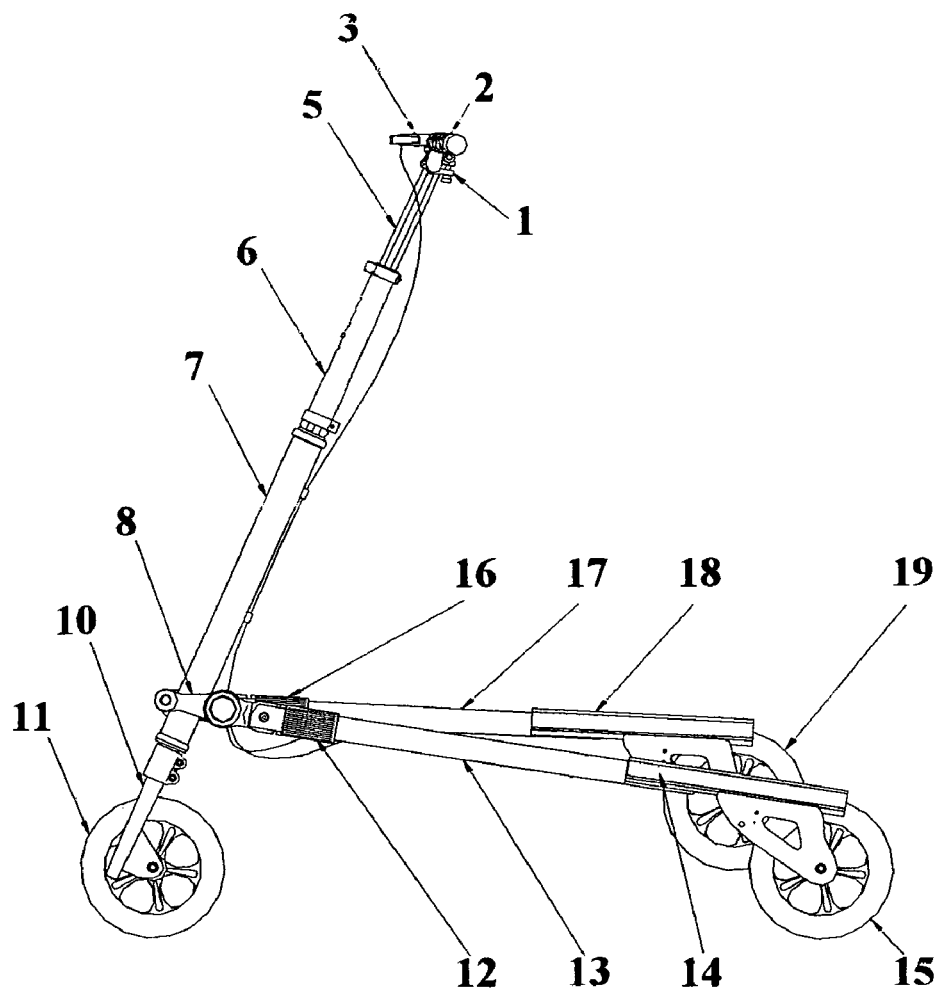
FIG. 1 is a side perspective view of the vehicle showing its general tricycle framework and interconnections of main components.
Figure 2:
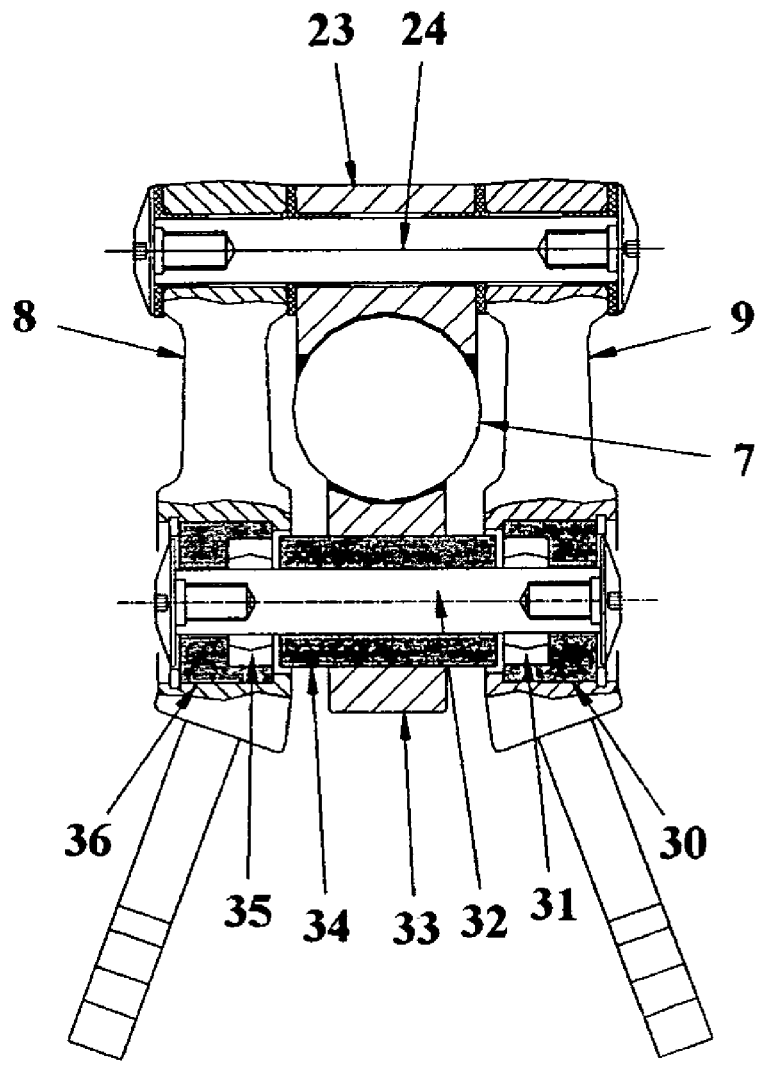
FIG. 2 is a section view of the cambering mechanism showing the main components and structure of this mechanism.
Figure 3:
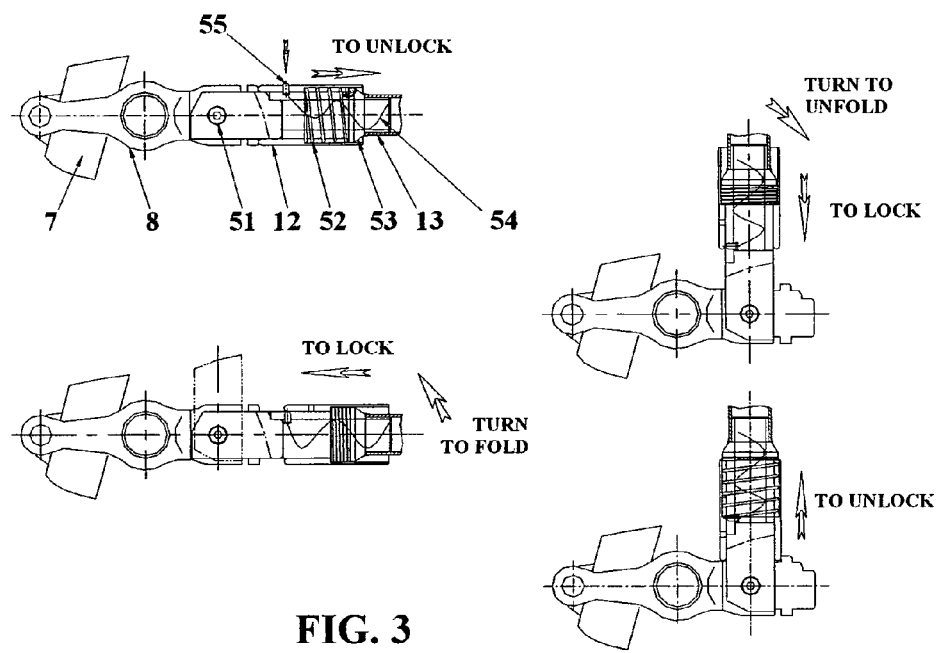
FIG. 3 is sectioned side view of the sleeve folding mechanism showing all the main components and structure. The trailing arm is shown both at folded and at extended positions; and the locking sleeve is shown both at locked and released positions.
Figure 4:
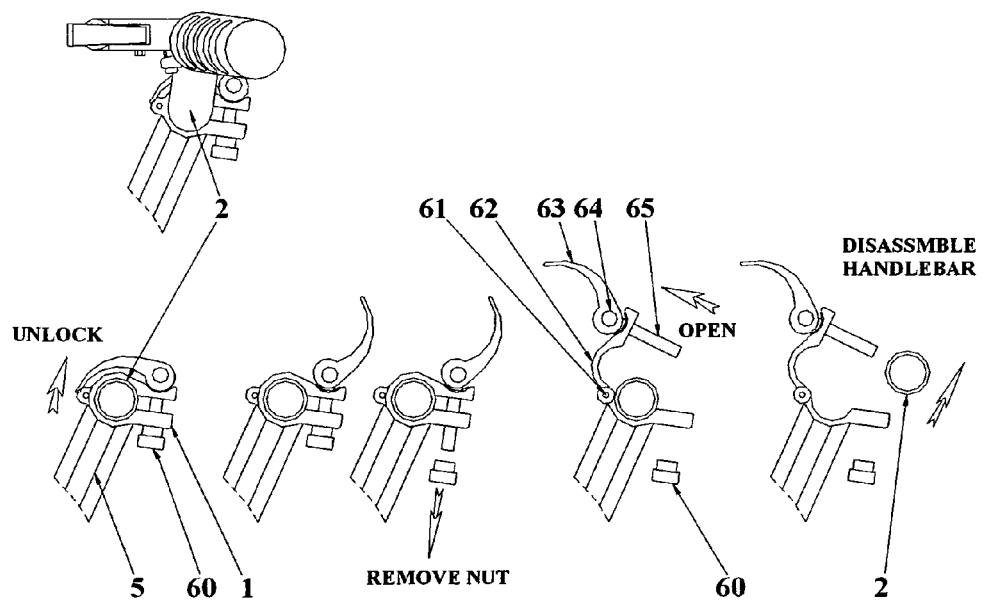
FIG. 4 is a structural and operation sequence view of handlebar locking mechanism. From left to right is the sequence of unlocking and removing the handlebar from the clamp.

Turning now descriptively to the drawings, the attached figures illustrate a cambering vehicle with rocking-bar cambering mechanism, anti-disengagement sleeve-type folding mechanism, a one-piece steering handlebar with a quick handlebar locking mechanism. The cambering vehicle comprises a tricycle frame with a front wheel steering mechanism, two trailing arms and two rear wheel brakes; a novel rocking-bar cambering mechanism; a novel anti-disengaging sleeve-based folding mechanism for folding trailing arms; and a novel handlebar clamping mechanism. As shown in FIG. 1, the front wheel steering mechanism comprises handlebar 2, steering shaft 5, steering shaft housing 6, steering column 7, front wheel mounting fork 10, and front wheel 11. The right and left trailing arms, respectively 13 and 17, are structures with their one end connected to the cambering linkage 8 and 9 accordingly. The other end of the trailing arms 13 and 17 are attached with foot pedals 14 and 18, and rear wheels 15 and 19. The brake system comprises brake handles 3 mounted on the handlebar 2, brake lines and brake shoes. As shown in FIG. 2, the rocking-bar cambering mechanism basically comprises a front mounting block 23, a front pivot pin 24, two cambering linkage 8 and 9, right and left respectively, two spherical bearings 35 and 31, two bearing cushions 36 and 30, a central mounting block 33, a cylindrical polymer energy storing element (polymer spring) 34, and a rocking-bar 32. As shown in FIG. 3, the anti-disengaging sleeve-type folding mechanism comprises pivot pin 51, locking sleeve 12, locking spring 52, cylindrical locking fork 53, anti-disengaging plunger 55 and plunger spring 54. As shown in FIG. 4, the handlebar locking mechanism comprises fixed half-moon 1, movable half-moon 62, pivot pin 61, locking lever 63, locking pin 64, tie rod 65 and tie nut 60.

As shown in FIG. 1, the front wheel steering mechanism comprises handlebar 2, steering shaft 5, steering shaft housing 6, steering column 7, front wheel mounting fork 10, and front wheel 11. The upper end of the steering shaft 5 is connected with the fixed half-moon 1 of the handlebar clamp, and the other end of the steering shaft 5 is inside the steering shaft housing 6, which is used for height adjustment. Near the lower end of the steering column 7 attached the front mounting block 23 and central mounting block 33. These two mounting blocks are part of the cambering mechanism. The front-wheel mounting fork has an upside down "U" shaped structure.

The right and left trailing arms, respectively 13 and 17, are structures with their one end connected to the cambering linkage 8 and 9 accordingly, and the other end of the trailing arms 13 and 17 are attached with foot pedals 14 and 18, and rear wheels 15 and 19. The left and right trailing arms 13 and 17 have identical construction, and the left trailing arm 13 is used as example for illustration here. The base structure of the left trailing arm 13 is a bent tube. The cylindrical locking fork 53 is attached at its one end, and foot pedal 14 and rear wheel 15 are at the other end, as shown in FIG. 1. The front end of the cylindrical locking fork 53 is connected to the cambering linkage 8 through pivot pin 51. The trailing arm is folded around this pivot pin.

The brake system comprises brake handles 3 mounted on the handlebar 2, brake lines and brake shoes. The brake lines run along the steering shaft 5, steering shaft housing 6, steering column 7, trailing arms 13 and 17, to reach the brake shoes underneath foot pedal 14 and 18 respectively.

As shown in FIG. 2, the rocking-bar cambering mechanism basically comprises a front mounting block 23, a front pivot pin 24, two cambering linkage 8 and 9, right and left respectively, two spherical bearings 35 and 31, two bearing cushions 36 and 30, a central mounting block 33, a cylindrical polymer energy storing element (polymer spring) 34, and a rocking-bar 32.

Figure 6:
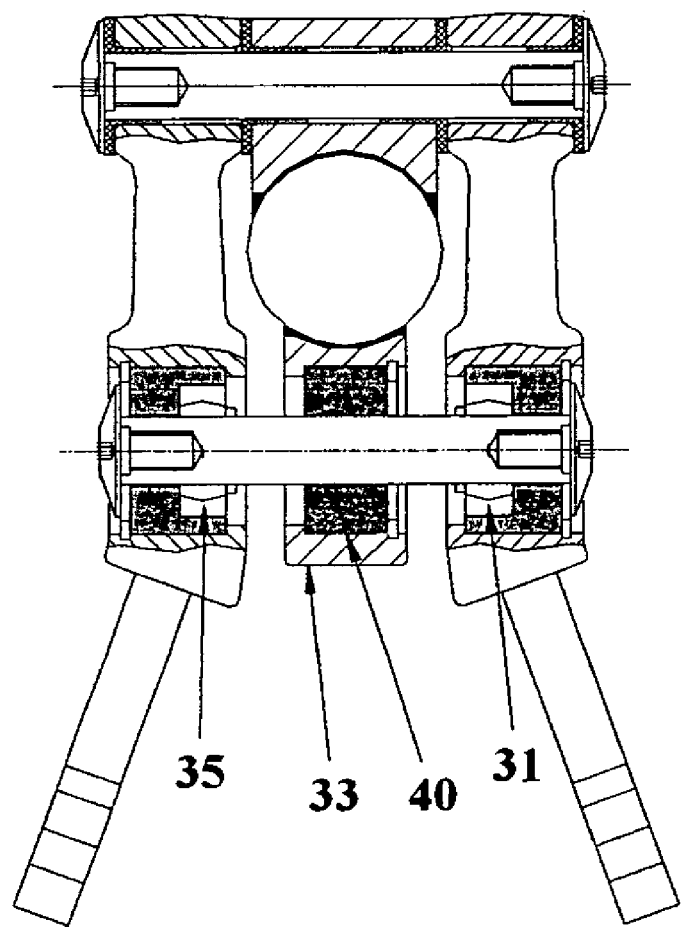
FIG. 6 shows a variation in construction of the cambering mechanism. The polymer energy storing element takes the form of a disk with a hole in the center where the rocking-bar is fitted.
Figure 7:
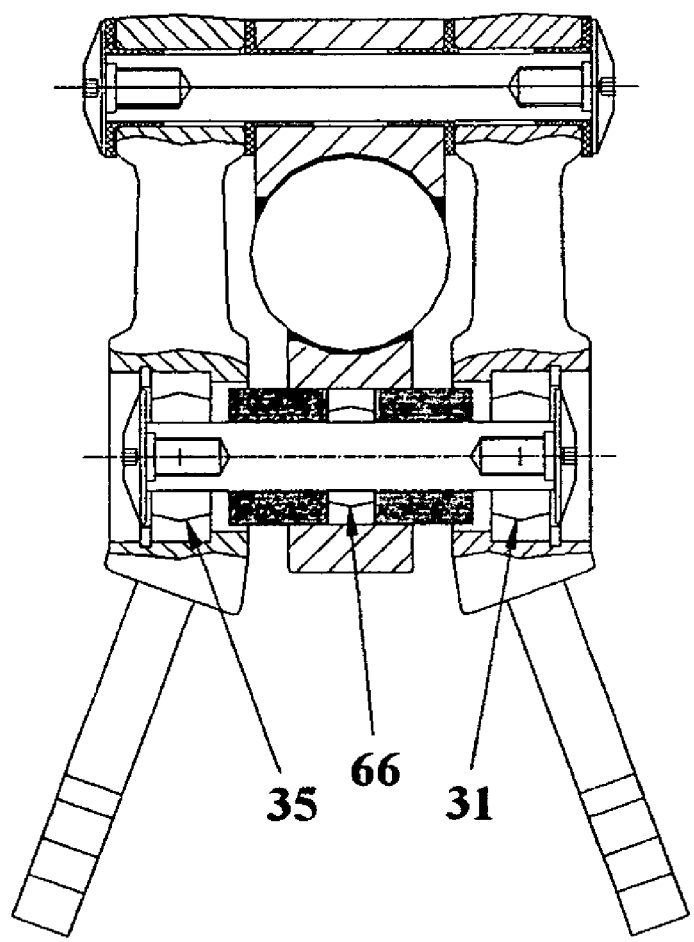
FIG. 7 shows another variation in construction of the cambering mechanism. A third spherical bearing is mounted inside the central mounting block and the polymer energy storing element takes the form of two pieces of cylindrical donuts.
Figure 8:
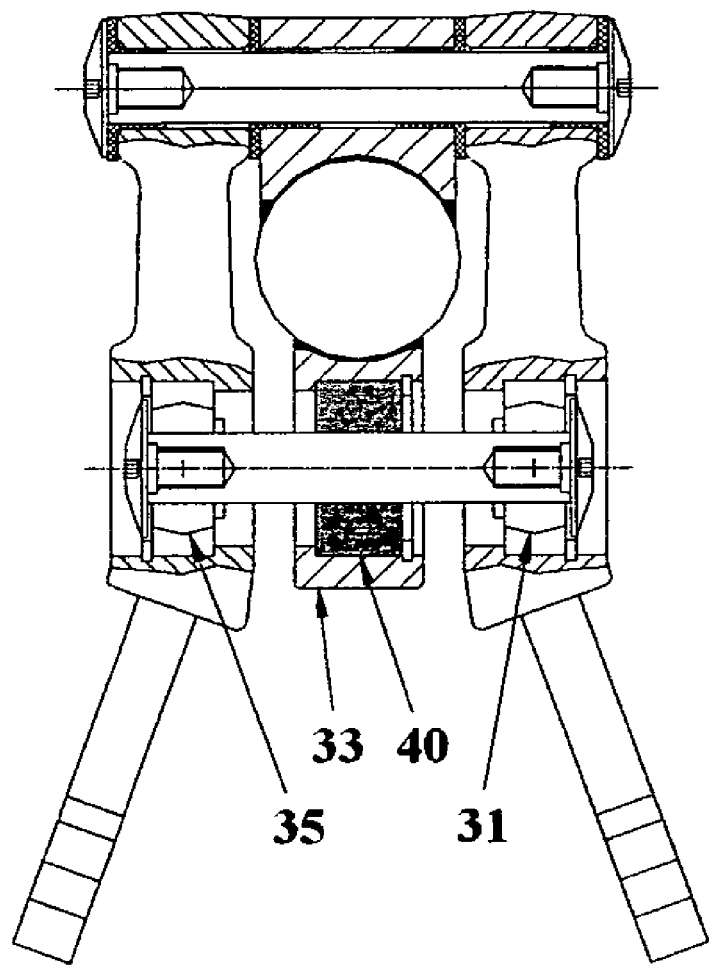
FIG. 8 shows another variation in construction of the cambering mechanism. The two spherical bearing, that the two ends of the rocking-bar are connected, are mounted inside the cambering linkages without cushions.

There are possible construction variations to the cambering mechanism described above. The spherical bearing cushions could be made of materials different from polymer, or even no cushions at all. The polymer spring could be a mechanical spring. Or, when the polymer spring is used, it could have a different form than a cylindrical one. The "spring" here means an element that deforms and stores and releases energy during cambering. FIG. 6, FIG. 7 and FIG. 8 show some of the construction variations, disk shaped polymer springs and no cushions to the spherical bearings, structural element 66, such as a bearing, embedded in the central mounting block. The deformation of the polymer springs of these variations is also shown.

FIG. 2, FIG. 6, FIG. 7 and FIG. 8 show the detailed structures of the mechanism and construction variations. Cambering vehicle uses tilting (cambering) of the vehicle to move forward in a sinusoidal path. The tilting of a regular tricycle without cambering mechanism will result in one of its rear wheels lifting off from the ground. Cambering mechanism is to provide extra "degree of freedom" to facilitating tilting that maintains all three wheels stay on the ground. As shown in the figure, Front mounting block 23 and central mounting block 33 are both attached to the outside of steering column 7, front pivot pin 24 connects the left cambering linkage 8 and the right cambering linkage 9 together through front mounting block 23. On the other side, two spherical bearings 35 and 31 are mounted in the bearing recesses on the polymer bearing cushions 36 and 30. The cushions are mounted in the housing on the two cambering linkage 8 and 9. The inner diameters of the bearings 35 and 31 are mounted on the rocking-bar 32. The rocking-bar is wrapped with the polymer spring 34, and the polymer spring 34 is secured by central mounting block 33.

Figure 5:
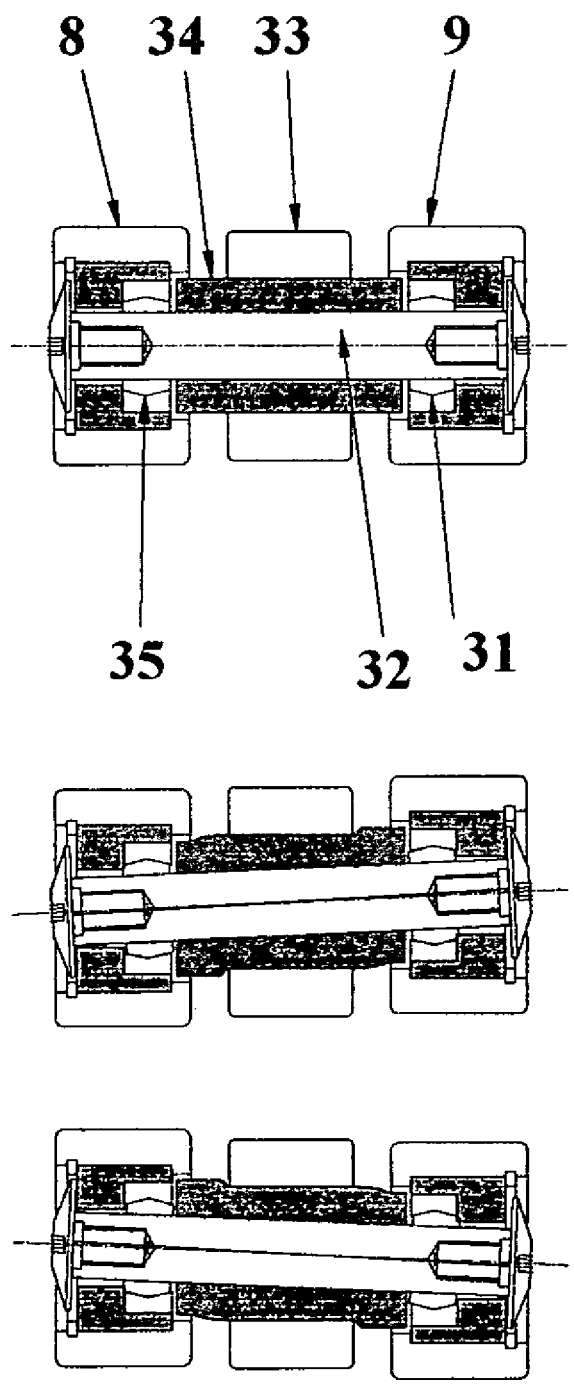
FIG. 5 illustrates the operation principle of the cambering mechanism showing the "rocking" of the rocking-bar and the deformation of polymer element.
Figure 9:
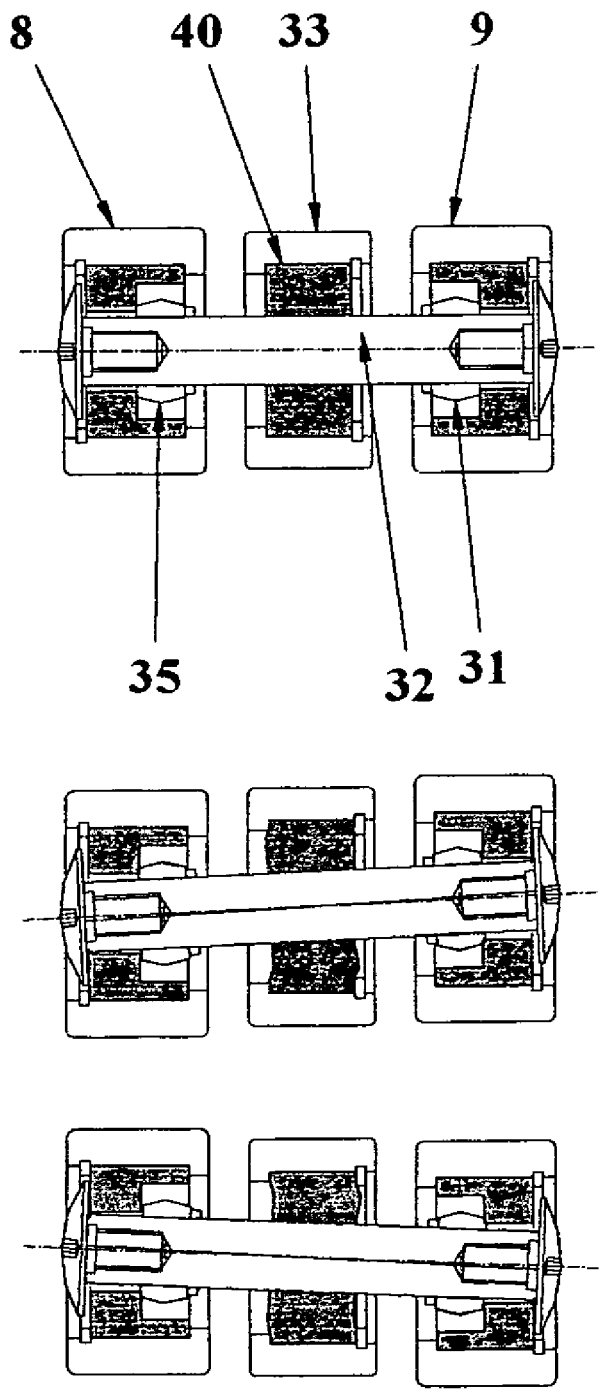
FIG. 9 illustrates the operation principle of the cambering mechanism for the variation in construction shown in FIG. 6

As shown in FIG. 1, FIG. 2 and FIG. 5, when the vehicle does the tilting (cambering), two trailing arms 13 and 17 will pivot around the front pivot pin 24. The pivoting will change positions of the two spherical bearings 35 and 31. They move in the opposite direction with equal amount of displacement. The drawing on the first row from top in FIG. 5 shows the neutral position of the polymer spring (in the case of a cylindrical design of polymer spring), i.e. when the vehicle is not tilted. As shown, there is no deformation to the polymer spring 34. FIG. 9 shows the case when the design of the polymer spring is in the form of a disk, 40. However, cambering changes the relation of the two bearings 35 and 31 with respective to central mounting block 33, this change will cause rocking-bar 32 to rotate with respective to the central mounting block 33 and deform polymer spring 34 or 40. This deformation creates a restoring force to restore the vehicle to its neutral position. FIG. 5 and FIG. 9 show some of the detail of this process. The deeper the tilting, the bigger the deformation and thus the bigger the restoring force. In this cambering mechanism, the restoring force is only by the polymer element 34 or 40. The spherical bearings are free joints, so the two trailing arms 13 and 17 don't have independent restoring force to overcome. With this rocking-bar mechanism, body weight overcomes the center polymer restoring force, and that's the only restoring force. (In the case of independent restoring forces on individual trailing arms, as with designs of prior arts discussed previously, the shifted body weight over comes only one of the restoring forces, the situation is especially true with deep tilting).

As shown in FIG. 3, the anti-disengaging sleeve-type folding mechanism comprises pivot pin 51, locking sleeve 12, locking spring 52, cylindrical locking fork 53, anti-disengaging plunger 55 and plunger spring 54. The folding mechanism on the left and right trailing arms are identical, so the left is used as the example for illustration here. The cylindrical fork 53 is attached to the trailing arm tube 13 at its rear end, and connected to the cambering linkage 8 through pivot pin 51. This is the pivot pin around which the trailing arm 13 is folded for convenience of storage. The end of the cambering linkage 8 is designed with notches and steps that it mates with the locking sleeve 12 in both folded and extended position, as shown in FIG. 3. The end of this cambering linkage 8 is also designed with a step to mate with the cylindrical locking fork 53 in the extended position to make the connection more robust. The details are shown in FIG. 3. The cylindrical locking fork 53 has a hole on its cylindrical wall for mounting of the anti-disengaging plunger 55, the plunger locked into a hole on the locking sleeve 12 in the extended position of the trailing arm to prevent the sleeve from disengaging. Spring 52 is used to push locking sleeve into engaging with the end of cambering linkage 8, it's covered inside the sleeve, for hiding pinch point and for better appearance.

As shown in FIG. 4, the handlebar locking mechanism comprises fixed half-moon 1, movable half-moon 62, pivot pin 61, locking lever 63, locking pin 64, tie rod 65 and tie nut 60. The fixed half-moon 1 is attached to the upper end of steering shaft. Movable upper half-moon 62 is connected to it through pivot pin 61. When moveable upper half-moon 62 turns to open as shown in the FIG. 4, it allows the handlebar 2 to be placed into or removed out of the clamp. Clamping lever 63 has a cam surface designed around its pivot hole 64 for applying clamping force. The lower end of the tie rod 65 is threaded, and nut 60 is attached at its end when clamping, as shown in the figure.

The rider of this vehicle operates it by standing atop on the left and right foot pedal 14 and 18, gripping onto the handlebar 2. The rider then pushes off with one foot, and quickly put this foot on the foot pedal. Then, with this initial motion, the rider starts to turn the vehicle with both a turning of the handlebar 2 and tilting of the vehicle. This tilting is executed by coordinated body-weight shifting and steering shaft tilting, toward the inside of the turn. The above-described maneuver is continued in the opposite direction, and the vehicle moves in a sinusoidal path.

The basic principle of this motion is well known. The above cambering maneuver converts body height changes into rotational inertial momentum. The rider propels the vehicle through body shifting.

To fold the trailing arm for storage (again, take only the left trailing arm as an example for illustration), the anti-disengaging plunger 55 is depressed and locking sleeve 12 is pulled all the way rearward. After the trailing arm is at 90 degree from its expended working position, the wall of lock sleeve 12 will lock into mating notch on the cambering linkage 8, thus keeps the trailing at this position until released by pull the lock 12 again. To remove handlebar 2 from the clamp for compact storage, follow the procedure illustrated in FIG. 4, and do the reverse to put it back.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cambering tricycle, comprising:

a frame comprising a front wheel steering mechanism, a left and a right trailing arm, a left and a right arm folding mechanism, a left and a right rear wheel brake system, and a cambering mechanism;

said front wheel steering mechanism having a handlebar mounted on a steering shaft which slides inside a steering shaft housing and pivots inside a steering column;

said steering column having a front mounting block constructed to support said cambering mechanism which interconnects said steering column and said left and right trailing arms;

said left and right trailing arms having foot pedals and wheel-mounts, and rear wheels mounted on said wheel mount;

said steering shaft having a wheel mounting fork and a front wheel mounted on said mounting fork;

said handlebar being locked onto said steering shaft by a handlebar locking mechanism comprising fixed and movable clamping pieces;

said left and right rear wheel brake systems having brake handles, brake lines and brake shoes said cambering mechanism comprising a rocking-bar, two spherical bearings, a cylindrical polymer energy storing element, a left and a right cambering linkage, and a front and a central mounting block;

said rocking-bar being attached to said two spherical bearings, each being mounted inside a left or right cambering linkage and said rocking-bar going through the inside of the cylindrical polymer energy storing element which is fitted inside said central mounting block;

said left and right cambering linkages being connected by a front pilot pin through said front mounting block constructed on said steering column;

said two spherical bearings each being mounted inside the left or right cambering linkage.

2. The cambering tricycle according to claim 1, wherein:

said left and right cambering linkages being connected to said left and right trailing arms through anti-disengaging sleeve-type folding mechanisms composed of a locking sleeve, a locking fork and a plunger pin.

3. The cambering tricycle according to claim 1, wherein:

said handlebar having a one-piece construction and being clamped with the handlebar locking mechanism;

said handlebar clamping mechanism having a fixed lower half-moon constructed at the upper end of the steering shaft and a movable upper half-moon being attached to the lower half-moon by a pivot pin.

* * * * *